(12) United States Patent
Chisnell

(10) Patent No.: US 7,195,283 B2
(45) Date of Patent: *Mar. 27, 2007

(54) SELF-CENTERING TUBULAR CONNECTION

(75) Inventor: Jerry H. Chisnell, Northville, MI (US)

(73) Assignee: Hutchinson, FTS, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/109,319

(22) Filed: Apr. 19, 2005

(65) Prior Publication Data

US 2005/0184513 A1    Aug. 25, 2005

Related U.S. Application Data

(63) Continuation of application No. 09/430,574, filed on Oct. 29, 1999, now Pat. No. 6,890,005.

(51) Int. Cl.
*F16L 41/00* (2006.01)

(52) U.S. Cl. .................. 285/208; 285/124.1; 285/351; 285/332

(58) Field of Classification Search ............... 285/208, 285/124.1, 351, 332, 205, 206, 334.4, 207
See application file for complete search history.

(56) References Cited

U.S. PATENT DOCUMENTS

| | | | |
|---|---|---|---|
| 4,603,886 A | 8/1986 | Pallini, Jr. et al. | |
| 4,610,467 A | 9/1986 | Reimert | |
| 4,611,829 A | 9/1986 | Hughes | |
| 4,659,116 A | 4/1987 | Cameron | |
| 4,660,803 A | 4/1987 | Johnston et al. | |
| 4,846,506 A | 7/1989 | Bocson et al. | |
| 4,893,677 A | 1/1990 | Brammer et al. | |
| 4,946,199 A | 8/1990 | Goubeaux et al. | |
| 4,986,574 A | 1/1991 | Beckman | |
| 5,004,272 A | 4/1991 | Kipp | |
| 5,174,612 A * | 12/1992 | Schnell .................. | 285/208 |
| 5,342,095 A | 8/1994 | Klinger et al. | |
| 5,364,131 A | 11/1994 | Hartsock et al. | |
| 5,368,336 A | 11/1994 | VanVleet et al. | |
| 5,372,388 A | 12/1994 | Gargiulo | |
| 5,372,392 A | 12/1994 | Dunn et al. | |
| 5,374,084 A | 12/1994 | Potokar | |
| 5,401,061 A | 3/1995 | Yamashita | |
| 5,423,577 A | 6/1995 | Ketcham | |
| 5,492,371 A | 2/1996 | Szabo | |

(Continued)

*Primary Examiner*—David Bochna
(74) *Attorney, Agent, or Firm*—VanOphem & VanOphem, P.C.

(57) ABSTRACT

A tubular connection for centering a tube within a female connecting block that has a throughbore with a chamfer, wherein a transition surface is defined between the chamfer and the throughbore. The tube has an upset bead, a tapered portion narrowing from the upset bead, and an end-form extending from the tapered portion, the end-form having an annular groove with an O-ring therein. The connection further includes a device for securing the tube within the female connecting block whereby the upset bead of the tube is caused to abut the female connecting block. The tube locates inside the female connecting block such that the end-form seals via the O-ring inside the throughbore of the female connecting block and the tapered portion of the tube sealingly engages against the transition surface of the female connecting block to keep the tube centered within the female connecting block and to form a secondary fluid-tight seal.

15 Claims, 3 Drawing Sheets

U.S. PATENT DOCUMENTS

| | | |
|---|---|---|
| 5,520,419 A | 5/1996 | DeBoalt et al. |
| 5,577,775 A | 11/1996 | Pearson et al. |
| 5,609,370 A | 3/1997 | Szabo et al. |
| 6,890,005 B1 * | 5/2005 | Chisnell .................... 285/208 |
| 6,896,298 B2 * | 5/2005 | Walterscheid et al. ...... 285/205 |

* cited by examiner

SELF-CENTERING TUBULAR CONNECTION

This application is a continuation of U.S. application Ser. No. 09/430,574, filed on Oct. 29, 1999, now U.S. Pat. No. 6,890,005 issued on May 10, 2005.

BACKGROUND OF THE INVENTION

1. Field of the Invention

The present invention relates to a tubular connection, and more particularly to a tube to block connection incorporating novel self-centering features for more reliability and better fluid-tight sealing in the service life of the connection.

2. Description of the Prior Art

In assembling certain air-conditioning units, such as those used in automobiles, it is common practice to secure a tube to a female connecting block. In order to effect a fluid-tight seal between the tube and the female connecting block, an O-ring is situated in an annular groove in an end-form on the tube. Typically, the end-form of the tube is initially secured in a male connecting block and then is attached to the female connecting block by a bolt that extends through an aperture in the male connecting block and threadingly engages the female connecting block. The bolt is located adjacent but spaced away from the tube that in turn engages the female connecting block via a throughbore therein.

The bolt is caused to threadingly engage the female connecting block by applying a torque in the clockwise direction to the head of the bolt. In turn, the clockwise torque on the bolt imparts a clockwise torque on the male connecting block causing it to rotate relative to the threads of the female connecting block in the clockwise direction. Since the tube is secured within the male connecting block, the tube likewise pivots relative to the threads of the female connecting block in the clockwise direction. Because the tube is also loosely located within the female connecting block when the torque is applied to the bolt, the tube undergoes a side-loading phenomenon within the throughbore. That is, the tube and associated O-ring translate within the female connecting block and become over-compressed on one side and under-compressed on an opposite side. The resultant uneven compression on the O-ring can result in premature failure of the O-ring at the over-compressed side and leakage of fluid past the O-ring seal at the under-compressed side over the life of the tubular connection.

Accordingly, there are many examples in the prior art of apparatus to assure proper alignment of tubular connections embodying similar male and female members. One such example is disclosed in U.S. Pat. No. 4,659,116 to Cameron. The Cameron patent discloses a fitting including a male part having a contoured lead end that engages a female end having a complementary contour. The male and female parts self align as they are joined together and create a fluid-tight seal. However, the contoured surfaces of the male and female parts do not prevent off-center compression of the O-ring once the fitting is clamped together by a threaded collar.

Further, the Cameron patent is representative of the prior art, which essentially focuses on alignment of male and female members during the joining process. However, the special problem of aligning a tube within a male-female connecting block connection as described hereinabove is not addressed in the prior art. The special problem applies to the present invention where torque is applied indirectly to the tube during the joining process. None of the prior art teaches or suggests apparatus for centering a tube within a female connecting block and maintaining the centering during the application of a torque imparted to the tube.

Accordingly, what is needed is a tube to block connection that provides a tube that supports an O-ring, wherein a male connecting block encircles part of the tube, and the tube can be centered in a bore within the female connecting block. The tube remains centered during the application of a torque to a fastener in the male connecting block. The resultant centering maintains even compression of the O-ring seal. Moreover, the mating tube and female connecting block can each accommodate a greater degree of variation in size and/or shape in either or both the tube and female connecting block.

SUMMARY OF THE INVENTION

In accordance with the present invention, the tubular connection includes a female connecting block having an end surface, an opposite end surface, and a throughbore therebetween. The throughbore has a chamfer in the end surface such that a transition surface is defined between the chamfer and the throughbore. The connection further includes a tube mounted in the throughbore of the female connecting block. The tube has a tapered portion that engages the transition surface of the female connecting block. The tapered portion of the tube terminates in an end-form that has an annular groove with an O-ring therein that forms a primary fluid-tight seal between the tube and the throughbore of the female connecting block. A secondary fluid-tight seal is defined by the engagement of the transition surface with the tapered portion of the tube.

According to an alternative configuration, a tapered ring may be used where it is not possible to form the tapered portion on the tube. Here, the tapered ring would encircle the end-form of the tube and replace the tapered portion described above. The tapered ring would function to provide the requisite interference fit with the transition surface of the female connecting block, thereby centering the tube in the throughbore.

Accordingly, it is an object of the present invention to provide a self-piloting O-ring seal for a tube to block connection that results in no damage to the O-ring during assembly.

It is yet a further object of this invention to center and constrain the tube within the bock so as to prevent lateral movement of the tube within the block.

It is yet a further object of this invention to prevent uneven side-loading of the O-ring within the female connecting block due to torquing of the fastener attached to the male connecting block.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
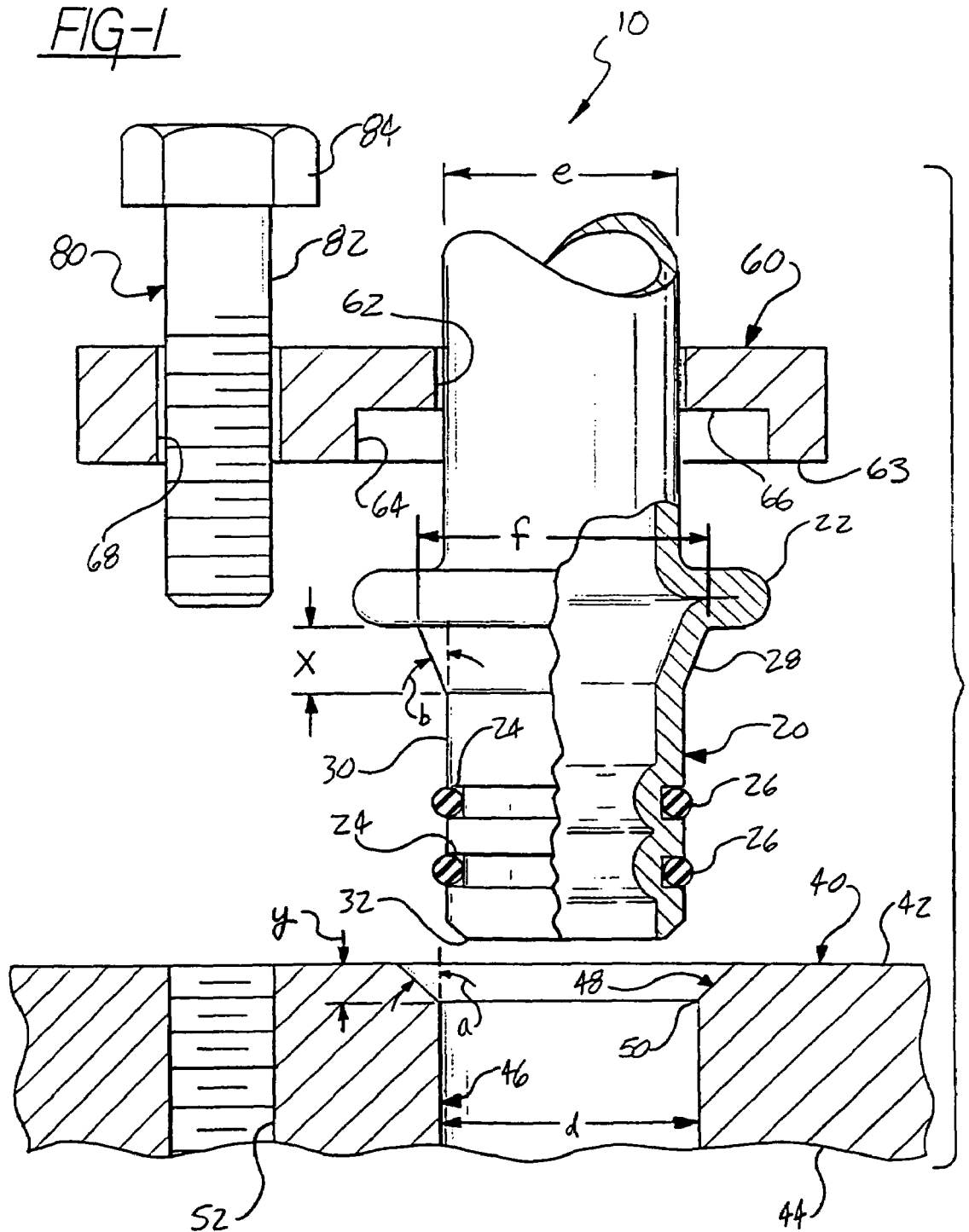
FIG. 1 is a partial cross-sectional exploded view showing the components of the tubular connection of the present invention before complete assembly.

In describing the preferred embodiment of the present invention, reference is made to the drawings, wherein there is seen in FIG. 1 the unassembled components of a tubular connection 10. The tubular connection 10 includes a tube 20, a female connecting block 40, a male connecting block 60, and a bolt 80.

The tube 20 is best seen in FIG. 1 and includes an upset bead 22 and a pair of annular grooves 24 on the outside diameter thereof. A pair of O-rings or seals 26 are seated in the annular grooves 24. The tube 20 includes a tapered portion 28 that narrows from the upset bead 22, terminating in an end-form 30 of the tube 20. Details of the tapered portion 28 are further discussed herein below.

The second component of the tubular connection 10 is the female connecting block 40 that includes an end or top surface 42, an opposite end, or bottom, surface 44, and a throughbore 46 therebetween. The throughbore 46 includes a chamfer 48 in the top surface 42. An annular edge or transition surface 50 is defined at the intersection of the chamfer 48 and the throughbore 46. The female connecting block 40 also includes a threaded hole 52 adjacent but spaced from the throughbore 46. Details of the chamfer 48 are further discussed hereinbelow.

Figure 2:
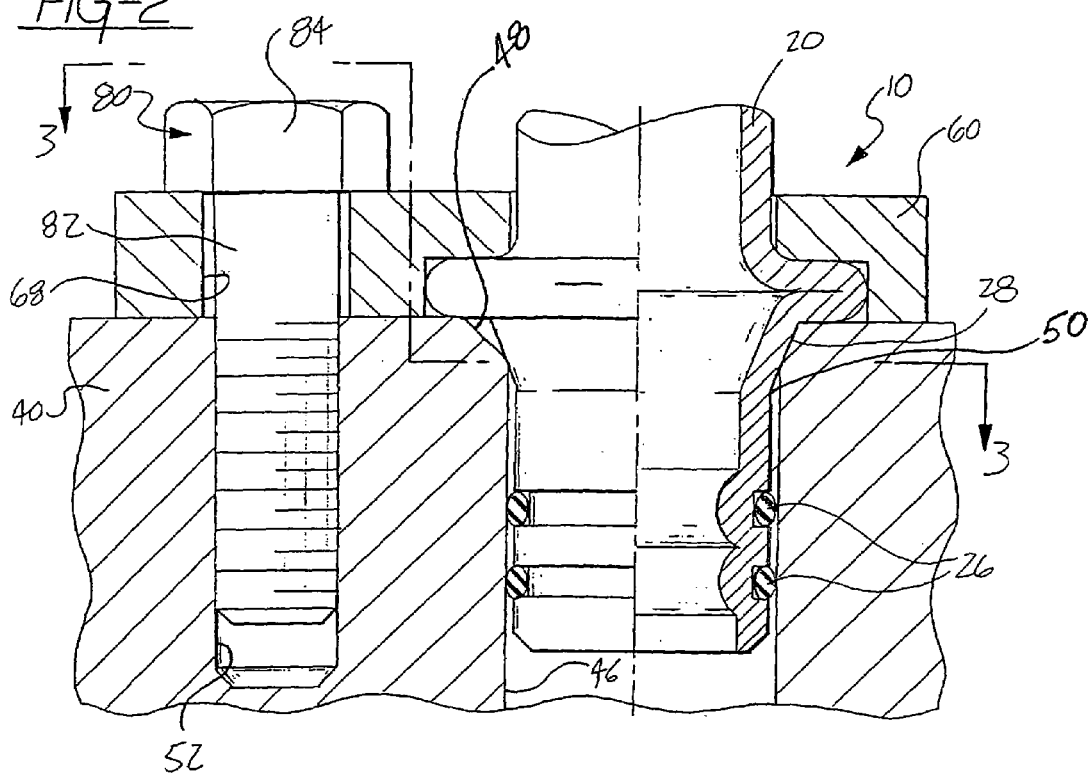
FIG. 2 is a partial cross-sectional view of the tubular connection having the male connecting block and tube secured to the female mounting block.

The third component of the tubular connection 10 is the male connecting block 60 that includes a throughbore 62 and a counterbore 64 in a mating surface 63 that intersect and are coaxial. The diameter of the counterbore 64 is greater than the diameter of the throughbore 62. The different size diameters of the throughbore 62 and counterbore 64 define a shoulder 66. As best seen in FIGS. 1 and 2, the diameter of the throughbore 62 is slightly greater than an outer diameter "e" of the tube 20. Similarly, the counterbore 64 is slightly greater in diameter than the diameter of the upset bead 22. The male connecting block 60 additionally includes a bolthole 68.

The fourth and final component of the tubular connection 10 is the bolt 80, which is conventional and includes a threaded shank 82 and a hexagonal head 84. The threaded shank 82 is smaller in diameter than the bolthole 68 of the male connecting block 60.

As best seen in FIG. 1, the chamfer 48 of the female connecting block 40 is oriented at an acute angle "a" to the axis of the throughbore 46 of the female connecting block 40. Likewise, the tapered portion 28 of the tube 20 is oriented at an acute angle "b" to the axis of the end-form 30 of the tube 20. The acute angles "a" and "b" can vary, but it is preferable that angle "a" be greater than angle "b". However, should angle "a" be less than angle "b", the invention would still work. Instead, the tapered portion 28 would engage the female connecting block 40 where the chamfer 48 intersects the top surface 42. Also, the tapered portion 28 of the tube 20 has an axial length "x" and the chamfer 48 has an axial length "y". Preferably, the axial length "x" should always be at least equal to the axial length "y" and more preferably, the axial length "x" should exceed the axial length "y". As above, however, should axial length "x" be less than axial length "y", the invention will still work. Further, the throughbore 46 of the female connecting block 40 has a diameter "d" that is intermediate a diameter "f" of the tapered portion 28 and the outer diameter "e" of the end-form 30.

As seen in FIG. 2, the guiding action of the chamfer 48 allows the O-rings 26 to attain the positions without the O-rings 26 undergoing uneven compression due to side-loading from torquing of the bolt 80. Therefore, the O-rings 26 circumferentially engage the throughbore 46 to define a primary fluid-tight seal. Additionally, the transition surface 50 sealingly engages the tapered portion 28 by circumferentially penetrating its surface to define a secondary fluid-tight seal.

Referring again to FIG. 1, assembly of the tubular connection 10 further involves placing the male connecting block 60 over a free end 32 of the tube 20 before the upset bead 22 is formed on the tube 20. Then the upset bead 22 is formed on the tube 20 and within the counterbore 64 of the male connecting block 60, by an axial upsetting process, as is well known in the art. The male connecting block 60 and the tube 20 are then advanced toward the top surface 42 of the female connecting block 40. The end-form 30 of the tube 20 is inserted into the throughbore 46 of the female connecting block 40. The upset bead 22 locates flat against the top surface 42 of the female connecting block 40, and the tapered portion 28 of the tube 20 engages the transition surface 50 of the female connecting block 40. Ultimately, the O-rings 26 form a primary fluid-tight seal between the tube 20 and the throughbore 46 of the female connecting block 40.

Referring now to FIG. 2, the final stage of assembly of the tubular connection 10 includes placing a threaded shank 82 of the bolt 80 through the bolt hole 68 of the male connecting block 60 and into the threaded hole 52 of the female connecting block 40. A clockwise torque is then applied to a hexagonal head 84 of the bolt 80 that causes the bolt 80 to threadingly engage the threaded hole 52 of the female connecting block 40. The engagement of the threaded hole 52 by the bolt 80 effects a locking arrangement between the male connecting block 60 and the female connecting block 40.

Figure 3:
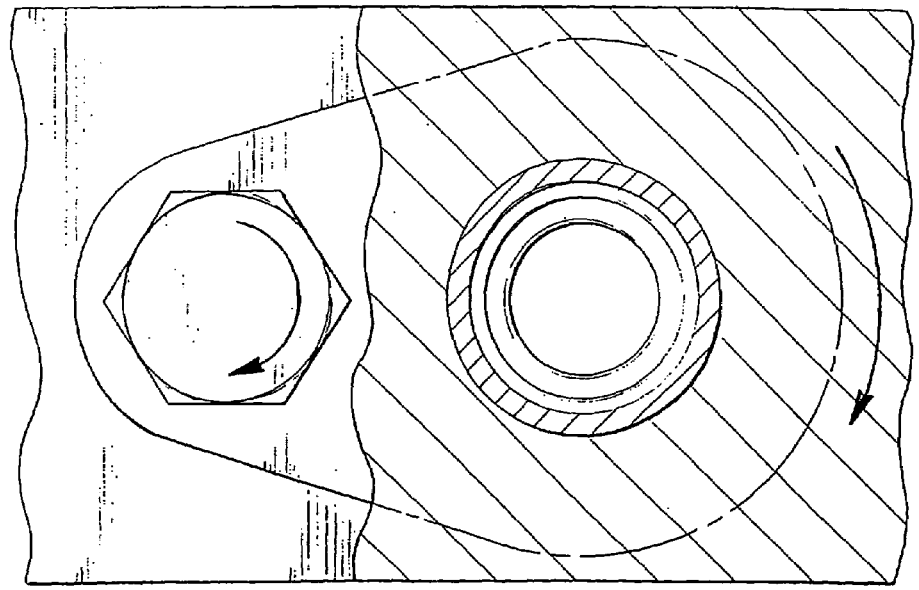
FIG. 3 is a partial cross-sectional view taken on the plane indicated by line 3—3 in FIG. 2.

Consequently, the application of the clockwise torque to the bolt 80 ordinarily would cause the male connecting block 60 to rotate a very slight amount about the throughbore 46 in the clockwise direction, as indicated by the arrows in FIG. 3. However, such rotation is resisted using the present invention because the tapered portion 28 pilots and thereby maintains the tube 20 centered within the throughbore 46 of the female connecting block 40. This resistance to rotation amounts to an absence of lateral movement of the tube 20 within the female connecting block 40 and prevents uneven compression of the O-rings 26. The absence of uneven compression of the O-rings 26 substantially reduces the incidence of premature failure in the O-rings 26 and resultant leakage of fluid past the O-rings 26.

Figure 4:
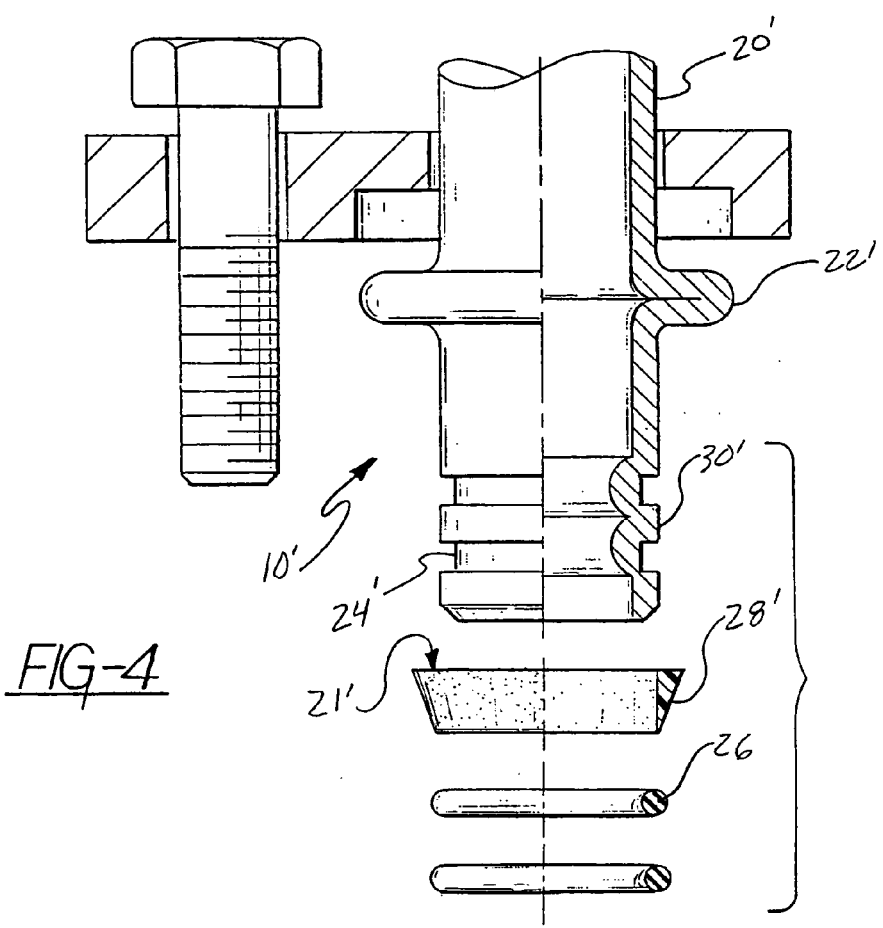
FIG. 4 is a partial cross-sectional exploded view of an alternative embodiment of the tube shown in FIG. 1.

In the foregoing preferred embodiment illustrated in FIGS. 1 through 3, the tube 20 was formed to include the tapered portion 28 in order to prevent movement of the tube 20 after being inserted into the female connecting block 40. The same result can be achieved without the tube 20 being formed to include the tapered portion 28 as shown in FIG. 4. There, a tubular connection 10' is an alternative embodiment of the tubular connection 10 seen in FIGS. 1 through 3. The only difference in the alternative connection 10' is that a tube 20' lacks the tapered portion 28 of FIGS. 1 through 3. The functionality of the tapered portion 28 in the tube 20 of FIGS. 1 through 3 is attained here by the use of a plastic or soft metal tapered ring 21' that initially is placed on the tube 20' encircling an end-form 30' and adjacent an upset bead 22'. The end-form 30' has a pair of annular grooves 24' that hold the pair of O-rings 26.

Figure 5:
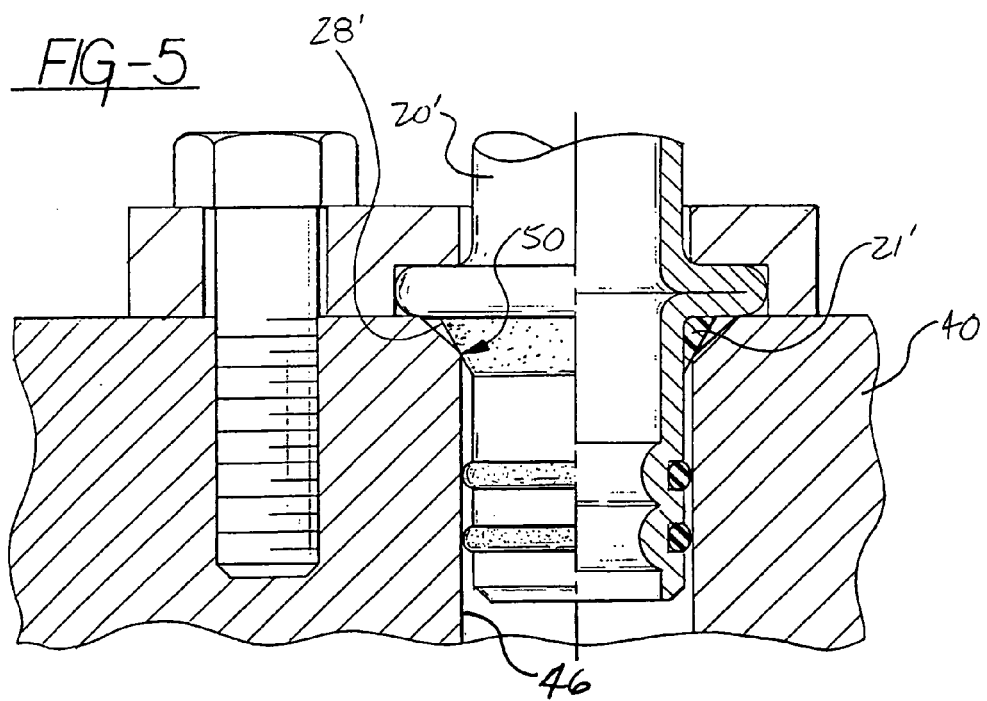
FIG. 5 is a partial cross-sectional view similar to FIG. 4 but shows the male connecting block and tube secured to the female mounting block.

Referring now to both FIGS. 4 and 5, the tapered ring 21' includes a tapered portion 28' that is analogous to the tapered portion 28 of the tube 20 of FIGS. 1 through 3. The tapered portion 28' bears the same relationship in terms of angles and distances to the female connecting block 40 of FIGS. 4 and 5, as does the tapered portion 28 of the tube 20 with respect to the female connecting block 40 of FIGS. 1 through 3. When the tube 20' is located within the female connecting block 40, the tapered ring 21' seats against the transition surface 50 of the female connecting block 40 to keep the tube 20' centered therein.

Accordingly, an advantage of the present invention is that the tube self-aligns to the female connecting block during assembly, thereby reducing the risk of damaging the O-rings. This self-aligning action also constrains and centers the tube within the female connecting block such that the tube is prevented from moving laterally within the female connecting block from the torque that is applied to the bolt. Preventing lateral movement of the tube prevents side loading the O-rings and leads to more equally distributed compressive loads upon the O-rings within the throughbore of the female connecting block. Tests conducted by the applicant reveal that this technology may result in 35% more squeeze at minimum material condition and may lead to a reduction in the tolerance stack-up for the tubular connection of 4%.

An additional advantage is that the sealing potential of the connection is improved. The transition surface of the female connecting block circumferentially penetrates into the tapered portion of the tube so as to form a secondary fluid-tight seal thus further preventing fluid from leaking from the connection. Finally, this technology will enable use of power tools to torque the tubular connection at higher torque without risk of side loading the O-rings.

From the foregoing description, it should be understood that various changes can be made in the above constructions without departing from the scope of the invention. It is intended that all matter contained in the above description or shown in the accompanying drawings shall be interpreted as illustrative and not in a limiting sense. For example, the tube need not include the upset bead, and may be secured to the female connecting block in any other conventional fashion.

What is claimed is:

1. A tubular connection, comprising:
    a female connecting block having an end surface, an opposite end surface, and a throughbore therein, said throughbore having a chamfer at said end surface, said chamfer defining a transition surface;
    a tube member mounted in said throughbore of said female connecting block, said tube having:
        an upset bead portion abutting said end surface of said female connecting block;
    a tapered portion that is seated against said transition surface of said chamfer of said female connecting block;
    an end-form portion mounted in said throughbore of said female connecting block; and
    means for sealing said throughbore in said female connecting block, said sealing means mounted to said tube member and engaging said throughbore of said female connecting block.

2. The tubular connection as claimed in claim 1, wherein the axial length of said tapered portion of said tube is greater than the axial length of said chamfer of said female connecting block.

3. The tubular connection as claimed in claim 2, wherein said chamfer is oriented at an acute angle "a" to the longitudinal axis of said throughbore of said female connecting block, and said tapered portion being oriented at an acute angle "b" to the longitudinal axis of said end-form of said tube.

4. The tubular connection as claimed in claim 1, wherein said transition surface of said chamfer of said female connecting block sealingly engages the circumference of said tapered portion of said tube to define a fluid-tight seal between said tube and said female connecting block.

5. The tubular connection as claimed in claim 1, wherein said tapered portion of said tube member further comprises a minor diameter and a major diameter; and further wherein said throughbore is greater than said end-form diameter of said tube member but lesser than said major diameter of said tapered portion of said tube member.

6. The tubular connection as claimed in claim 1, wherein said means for sealing further comprises:
    at least one annular groove located in said end-form portion of said tube member; and
    at least one seal member mounted in said at least one annular groove in said end-form portion of said tube member whereby said at least one seal member forms a primary seal between said tube member and said female connecting block.

7. The tubular connection as claimed in claim 6, wherein said transition surface of said female connecting block sealingly engages the circumference of said tapered portion of said tube member to define a secondary fluid-tight seal between said tube member and said female connecting block.

8. The tubular connection as claimed in claim 1, further comprising:
    means for securing said tube member within said throughbore of said female connecting block, said securing means mounted to said end surface of said female connecting block.

9. The tubular connection as claimed in claim 8, wherein said securing means includes a male connecting block circumscribing said tube member.

10. A tubular connection comprising:
    a female connecting block having an end surface, an opposite end surface, and a throughbore therein, said throughbore having a chamfer at said end surface, said chamfer defining a transition surface;
    a tube member mounted in said throughbore of said female connecting block, said tube member terminating in an end-form portion, said tube member further comprising:
        a tapered ring member circumscribing said end-form and having a tapered portion thereon, said tapered portion of said tapered ring member being seated against said transition surface of said chamfer of said female connecting block, said end-form portion being mounted in said throughbore of said female connecting block; and
    means for sealing said throughbore in said female connecting block, said sealing means mounted to said tube member and engaging said throughbore of said female connecting block.

11. The tubular connection as claimed in claim 10, wherein the axial length of said tapered ring member is greater than the axial length of said chamfer of said female connecting block.

12. The tubular connection as claimed in claim 10, wherein said chamfer is oriented at an acute angle "a" to the longitudinal axis of said throughbore of said female connecting block, and said tapered portion of said tapered ring member is oriented at an acute angle "b" to the longitudinal axis of said end-form of said tube.

13. The tubular connection as claimed in claim 10 wherein said tapered portion of said tapered ring member further comprises a minor diameter and a major diameter; and further wherein said throughbore is greater than said end-form diameter of said tapered ring member but lesser than said major diameter of said tapered portion of said tapered ring member.

14. The tubular connection as claimed in claim 10, wherein said transition surface of said female connecting block sealingly engages the circumference of said tapered portion of said tapered ring member to define a secondary fluid-tight seal between said tube member and said female connecting block.

15. The tubular connection as claimed in claim 10, wherein said means for sealing further comprises:
- at least one annular groove located in said end-form portion of said tube member; and
- at least one seal member mounted in said at least one annular groove in said end-form portion of said tube member whereby said at least one seal member forms a primary seal between said tube member and said female connecting block.

* * * * *

UNITED STATES PATENT AND TRADEMARK OFFICE
CERTIFICATE OF CORRECTION

PATENT NO. : 7,195,283 B2 Page 1 of 1
APPLICATION NO. : 11/109319
DATED : March 27, 2007
INVENTOR(S) : Jerry H. Chisnell It is certified that error appears in the above-identified patent and that said Letters Patent is hereby corrected as shown below:

In Column 4, after Line 3, kindly insert the following paragraph --The key objective in aligning the tube 20 in the female connecting block 40 is to avoid uneven compression of the O-rings 26 during the assembly processs. The first stage of the assembly process includes placing the tube 20 within the female connecting block 40. In so doing, the chamfer 48 acts as a guide in order that the tube 20 may be centered within the throughbore 46. The upset bead 22 is caused to mount flush against the top surface 42 of the female connecting block 40 and the tapered portion 28 of the tube 20 is caused to pilot and center about the transition surface 50 of the female connecting block 40.--.

In Column 4, Line 31, kindly delete "a" and insert --the--.

In Column 4, Line 35, kindly delete "a" and Insert --the--.

Signed and Sealed this

Nineteenth Day of June, 2007

JON W. DUDAS
*Director of the United States Patent and Trademark Office*